United States Patent [19]

Fukuma et al.

[11] 4,121,331

[45] Oct. 24, 1978

[54] METHOD FOR MANUFACTURING A FRICTION SPEED CHANGE GEARING

[75] Inventors: Nobuo Fukuma, Toyota; Yoshito Katou, Aichi, both of Japan

[73] Assignee: Toyota Jidosha Kogyo Kabushiki Kaisha, Toyota, Japan

[21] Appl. No.: 760,679

[22] Filed: Jan. 19, 1977

[30] Foreign Application Priority Data

Nov. 1, 1976 [JP] Japan ................. 51-131536

[51] Int. Cl.² .............................................. B23P 19/00
[52] U.S. Cl. ......................................... 29/434; 29/447; 29/469; 74/798
[58] Field of Search ............... 29/447, 469, 434; 74/798

[56] References Cited

U.S. PATENT DOCUMENTS

| | | | |
|---|---|---|---|
| 881,471 | 3/1908 | Hoffman | 29/447 UX |
| 1,146,372 | 7/1915 | Neukirch | 29/447 |
| 3,600,976 | 8/1971 | Hewko | 74/798 |
| 3,793,907 | 2/1974 | Nakamura | 74/798 |
| 3,817,125 | 6/1974 | Nakamura et al. | 74/798 |

*Primary Examiner*—Charlie T. Moon
*Attorney, Agent, or Firm*—Stevens, Davis, Miller & Mosher

[57] ABSTRACT

A method of manufacturing a friction speed change gearing of the type which comprises a housing, inner and outer races, a plurality of cylindrical planetary rollers mounted between the inner and outer races subject to elastic deformation, and a spider member engaging the planetary rollers, wherein the method is characterized by forming a first assembly including the inner race and the planetary rollers and a second assembly including the housing and the outer race, forming a temperature differential between the two assemblies, inserting the first assembly into the outer race in the second assembly and removing the temperature differentiation so that the rollers are uniformly compressed due to a thermal deformation which occurs when the temperature differentiation has been removed.

4 Claims, 4 Drawing Figures

1

METHOD FOR MANUFACTURING A FRICTION SPEED CHANGE GEARING

BACKGROUND OF THE INVENTION

1. Field of the Invention

The present invention relates to a method of manufacturing a friction speed change gearing of a type which comprises a housing, first and second rotary shafts rotably supported in said housing in axial alignment with each other, an inner race supported by said first rotary shaft, an outer race supported by said housing to be co-axial with said inner race, a plurality of cylindrical rollers mounted between said inner and outer races subject to an elastic deformation, and a spider member supported by said second rotary shaft to engage said rollers in a manner to allow them to freely rotate around their own axes and to drive or to be driven by said rollers when they make a planetary movement.

2. Description of the Prior Art

In the aforementioned friction speed change gearings, when said first rotary shaft is rotated by an outer driving power, the driving torque is transmitted to said second rotary shaft in a speed changing manner (in a speed reducing manner in this case) by way of said plurality of cylindrical rollers which make a planetary movement in an annular space defined by said outer and inner races and said spider member engaging said rollers.

In manufacturing a friction speed change gearing of this type, when said rollers are mounted in said annular space, they must be somewhat deformed or compressed in a diametrical direction. However, it is difficult to insert the relatively small cylindrical rollers into said annular space while compressing them in a diametrical direction and there is a danger that the rollers are damaged or distorted during such an inserting process thereby causing a problem that the friction speed change gearing does not provide an expected performance in operation.

In dealing with this problem, it has been proposed in Japanese Patent Application No. 53901/71 filed by the same assignee as that of the present application to manufacture a friction speed change gearing of this type by first forming a pre-assembly of said first rotary shaft, inner race, rollers, outer race, spider member, and second rotary shaft and secondly pressing the pre-assembly into a bore of the housing, wherein said bore is formed to have an inner diameter which is a little smaller than the outside diameter of said outer race so that said outer race is contracted when it has been pressed in said housing bore, thereby applying an elastic pre-stressing to said rollers, or by first preparing a pre-assembly of said first rotary shaft, etc., inserting said pre-assembly into a bore of the housing having an inner diameter which is larger than the outer diameter of said outer race and finally pressing an annular wedging member into an annular space left between said housing bore and said outer race, thereby contracting said outer race so as to apply an elastical prestressing to said rollers.

SUMMARY OF THE INVENTION

By contrast to the abovementioned former proposition which depends upon the concept of mechanically applying a contraction force to the outer race when mounting an assembly of the inner race, outer race and a plurality of cylindrical rollers mounted therebetween into the housing, the present invention proposes to apply an elastic pre-stressing to said plurality of rollers by thermally deforming the members concerned before assembly. In more detail, the present invention proposes a method of manufacturing a friction speed change gearing of the abovementioned type which comprises the steps of forming a provisional assembly of said first rotary shaft, inner race, rollers, spider member and second rotary shaft, forming a second assembly of said housing and outer race, heating said second assembly up to a temperature at which the inner diameter of said outer race which is normally smaller than that of the circumcircle of said rollers becomes larger than that of said circumcircle, inserting said provisional assembly into said second assembly and thus uniformly compressing said rollers due to a contraction of said housing and said outer race when they are returned to a normal temperature or a similar method which comprises the steps of forming similar provisional and second assemblies, cooling said provisional assembly down to a low temperature at which the diameter of the circumcircle of said rollers which is normally larger than the inner diameter of said outer race becomes smaller than said inner diameter, inserting said provisional assembly into said second assembly, and uniformly compressing said rollers due to expansion of said provisional assembly when it has been returned to a normal temperature.

BRIEF DESCRIPTION OF THE DRAWING

In the accompanying drawing.

DESCRIPTION OF THE PREFERRED EMBODIMENT

In the following the invention will be described in more detail with reference to the accompanying drawings.

Figure 1:
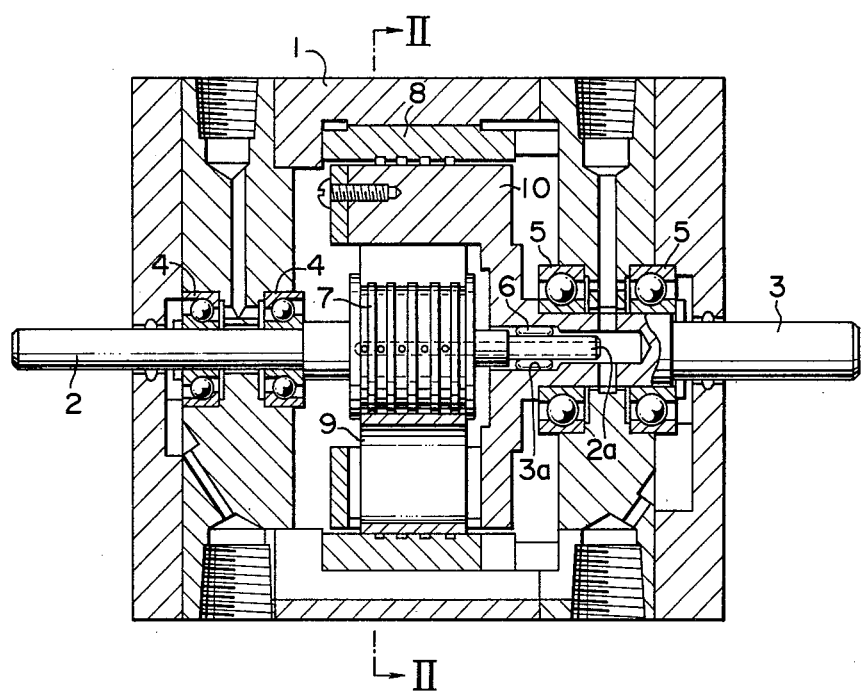
FIG. 1. is a longitudinal sectional view of a friction speed change gearing for which the manufacturing method of the present invention can be applied.
Figure 2:
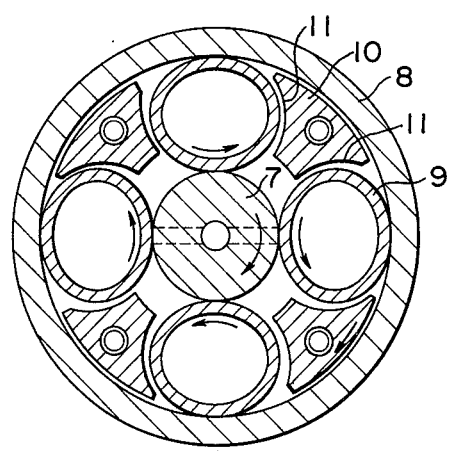
FIG. 2. is a simplified transverse sectional view along line II—II in FIG. 1.

Referring to FIGS. 1 and 2 showing an example of the friction speed change gearing to which the method of the present invention is applicable, 1 designates a housing of the friction speed change gearing which, in the shown structure, is composed of several parts for the convenience of production and assembly. A first rotary shaft 2 and a second rotary shaft 3 are mounted in the housing 1 as rotatably supported by bearing means 4 and 5, respectively, in axial alignment with each other. In the following, only for the purpose of explanation, the shaft 2 is called the "input" shaft while the shaft 3 is called the "output" shaft, although they may be operated in a reversed manner so that the shaft 3 is an input shaft while the shaft 2 is an output shaft. In this connection, in the former case the friction speed change gearing naturally operates as a speed reduction gearing, whereas in the latter case the gearing operates as a speed multiplying gearing. The inner end of the input shaft 2 is formed as a reduced portion 2a which is rotatably received in a bearing bore 3a formed in the inner end portion of the output shaft 3 by way of needle elements 6, whereby the input and output shafts 2 and 3 are rotatably connected with or supported by each other at their inner ends and individually rotate around a common axis. An inner race 7 is mounted on the input shaft 2 and, in co-axial relation to the inner race, an outer race 8 is supported by the housing 1. Between the inner race 7 and the outer race 8 are mounted a plurality of cylindrical rollers 9 subject to an elastic deformation in diametrical directions so that the rollers present a somewhat elliptical configuration as shown in FIG. 2 in an exaggerated manner. A spider member 10 supported by the output shaft 3 is provided so as to engage said rollers in a manner to allow them to freely rotate around their own axes and to be driven by said rollers when they make a planetary movement around the annular space formed between the inner race 7 and the outer race 8. In the shown example of the friction speed change gearing the spider member 10 has arcuate bearing surfaces 11 adapted to engage the outer surfaces of the rollers 9 in a manner to maintain an oil film between the contacting surfaces when the rollers rotate relative to the bearing surfaces during their planetary movement. Although there are known various types of gearings which belong to the friction speed change gearing of the present category, the gearing of the structure as shown in FIG. 1 and 2 has an advantage in that the rollers are of a lighter weight thereby reducing the centifugal force generated therein, are better cooled in operation and are more relieved from various problems such as deformation, friction wearing, burn sticking, etc.

Now the method of the present invention for manufacturing or assembling the friction speed change gearings will be explained with reference to FIGS. 3 and 4.

Figure 3:
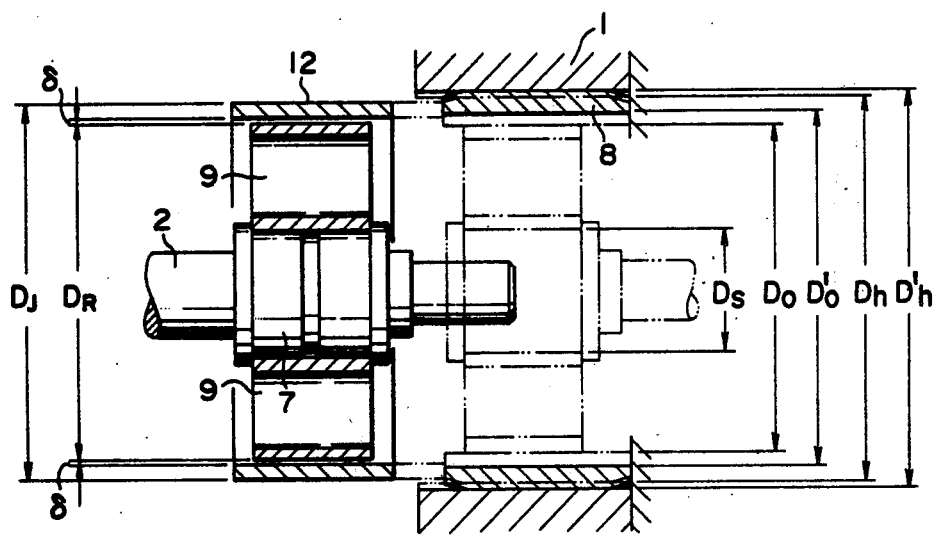
FIGS. 3 and 4 are diagramatical longitudinal and transverse sectional views showing essential parts of a friction speed change gearing, illustrating the manufacturing method of the present invention.
Figure 4:
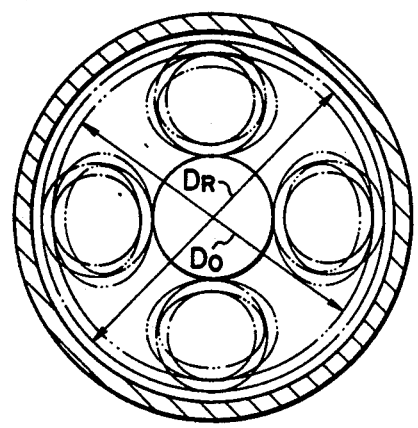

First, the input shaft 2, inner race 7, rollers 9, spider member 10 and output shaft 3 which have individually been finished to predetermined dimensions are provisionally assembled as shown in FIG. 3 by employing a cylinder member 12 having inner and outer diameters as explained hereinunder. (In FIG. 3, however, the spider member and the output shaft are omitted for the sake of clarity in illustration.) On the other hand, another assembly of the housing 1 and the outer race 8 is prepared by mounting the latter in the former and providing a proper detent means between the two members. The assembly of the housing and the outer race is then soaked in a bath of hot oil and heated up to a predetermined temperature as explained hereinunder. When the assembly of the housing and the outer race has been heated up to the predetermined temperature, it is taken out of the oil bath and the first mentioned provisional assembly of the input shaft, inner race, rollers, spider member and output shaft is inserted into the assembly of the housing and outer race in a manner as explained hereinunder. As shown in FIG. 3, the cylinder member 12 of the provisional assembly is moved along the bore of the housing 1 which receives the outer race 8 until one end of the cylinder member abuts against one end of the outer race, and then the provisional assembly of the input shaft, inner race, rollers, spider member and output shaft is further moved into the outer race 8 until they come to a correct axial position with respect to the outer race and the housing while leaving the cylinder member 12 in the axial abutment with the outer race. Then the cylinder member 12 is removed and the housing 1 and the outer race 8 are cooled down to normal termperature. When the housing and the outer race are returned to normal temperature, they naturally contract and exert a diametrical compression on the rollers 10 which are then elastically pre-stressed in their assembled condition.

The dimensional conditions for the present method will now be explained. Designating the outer diameter of the cylinder rollers by $D_r$, the diameter of the circumcircle of the plurality of cylindrical rollers 9 by $D_R$, the outside diameter of the cylinder member 12 for the provisional assembly by $D_J$, the inner diameters of the outer race 8 before and after its thermal expansion by $D_o$ and $D_o'$, the inner diameters of the housing 1 before and after its thermal expansion by $D_h$ and $D_h'$ and the difference between the inner diameter of the cylinder member 12 and the diameter $D_R$ of the circumcircle of the plurality of rollers 9 by $2\delta$, the following relation is presumed to be satisfied:

$$D_h > D_J > D'_o > D_R + 2\delta > D_R > D_O$$

In this case the thermal shrinkage $2\epsilon$ is expressed by the following equation:

$$2\epsilon = D_R - D_O$$

Herein $\epsilon$ corresponds to the elastic deformation effected for one roller 9.

Now, by designating the maximum contacting stress (surface pressure) to be effected between the cylindrical rollers and the outer race 8 for accomplishing normal friction driving of the gearing by $\sigma$ max, the thickness of the cylindrical rollers 9 by h, the elastic deformation $\epsilon$ of the cylindrical rollers 9 is given by the following formula:

$$\epsilon = 0.85 \times 10^{-4} \times \frac{D_r^3(\frac{1}{E_r} + \frac{1}{E_o})}{16h^3(\frac{1}{D_r} - \frac{1}{D_o})} \times \frac{\sigma^2 \max}{0.418} \times (mm)$$

Herein Er and Eo are the modulus of elasticity of the cylindrical rollers 9 and the outer race 8.

By expressing the temperature difference for the thermal shrinkage by $\Delta T$ and the thermal expansion coefficient of the outer race 8 by $k$ and assuming that the thermal expansion of the outer race is very small when compared with its inner diameter $D_o$, the following equation is generally established:

$$D'_0 - D_0 = \frac{D_0}{2} \Delta T$$

Since the conditon to be satisfied when the aforementioned provisional assembly of the input shaft, etc., is inserted into the heated up assembly of the housing and outer race is:

$$D_O' - D_R > 0$$

the following conditions are obtained to be satisfied for performing the method of the present invention:

$$\frac{kD_o}{2} \cdot \Delta T - 2\epsilon > 0$$

$$\therefore \Delta T > \frac{4\epsilon}{kD_0} = 0.85 \times 10^{-4} \times \frac{D_r^7 \left( \frac{1}{e_r} + \frac{1}{E_0} \right)}{4kh^3 \left( \frac{D_0}{D_r} - 1 \right)} \times \left( \frac{\sigma \max}{0.418} \right)^2$$

Therefore, when the dimensions $h$, $D_r$ and the material of the cylindrical rollers 9, the inner diameter $D_o$ and the material of the outer race 8 and the contacting pressure $\sigma$ max required for the cylindrical rollers 9 to accomplish the friction driving are determined, the minimum temperature for the thermal shrinkage is obtained from Formula (1).

The method of the present invention to be performed depending upon the above engaging relations can also be performed by maintaining the assembly of the housing 1 and outer race 8 at normal temperature while soaking the provisional assembly of the input shaft 2, inner race 7, rollers 9, spider member 10, output shaft 3 and cylinder member 12 in a bath of a cold medium to cool them down to a predetermined low temperature.

From the foregoing it will be appreciated that the present invention requires a simple cylinder member 12 for the provisional assembly and a bath of hot oil or a low temperature liquid and that, in spite of this simple provision, the assembling process of the friction speed change gearing is made substantially easier when compared with the conventional process which depends upon the concept of mechanically applying pre-stressing to the friction rollers.

Although the invention has been explained with reference to particular embodiments thereof, it will be understood by those skilled in the art that various modifications can be made with respect to these embodiments without departing from the spirit of the invention.

We claim:

1. In a method of manufacturing a friction speed change gearing comprising a housing, first and second rotary shafts rotatably supported in said housing in axial alignment with each other, an inner race supported by said first rotary shaft, an outer race supported by said housing to be co-axial with said inner race, a plurality of cylindrical rollers mounted between said inner and other races and subjected to elastic deformation, a spider member supported by said second rotary shaft to engage said rollers in a manner to allow them to freely rotate around their own axes and to drive or to be driven by said rollers when they make a planetary movement, the improvement comprising the steps of forming a first assembly of said first rotary shaft, inner race, rollers, spider member and second rotary shaft by employing a tubular cylinder member as a means for provisionally enclosing and holding said first assembly therein, forming a second assembly of said housing and outer race, differentiating the temperature of one of said two assemblies relative to that of the other such that the inner diameter of said outer race which is normally smaller than that of the circumcircle of said rollers becomes larger than that of said circumcircle, abutting the end of said provisional cylinder member against the outer race preparatory to inserting said first assembly into said second assembly, inserting said first assembly into said outer race in said second assembly, and removing said temperature differentiation so that said rollers are uniformly compressed between said inner and outer races.

2. The method of claim 1, wherein said differentiation in temperature is effected by heating said second assembly up to a predetermined temperature.

3. The method of claim 1, wherein said differentiation in temperature is effected by cooling said first assembly down to a predetermined cryogenic temperature.

4. The method of claim 1, wherein said spider member has arcuate bearing surfaces adapted to engage the outer surfaces of said rollers, said arcuate bearing surfaces engaging the outer surfaces of said rollers during said step of removing said differentiation of temperature so as to maintain the axes of said rollers to be parallel to the axis of said inner race.

* * * * *